(12) United States Patent
Whealton et al.

(10) Patent No.: US 6,190,507 B1
(45) Date of Patent: Feb. 20, 2001

(54) METHOD FOR GENERATING A HIGHLY REACTIVE PLASMA FOR EXHAUST GAS AFTERTREATMENT AND ENHANCED CATALYST REACTIVITY

(75) Inventors: John H. Whealton, Oak Ridge; Gregory R. Hanson, Clinton; John M. Storey; Richard J. Raridon, both of Oak Ridge, all of TN (US); Jeffrey S. Armfield, Upsilanti, MI (US); Timothy S. Bigelow; Ronald L. Graves, both of Knoxville, TN (US)

(73) Assignee: The United States of America as represented by the Department of Energy, Washington, DC (US)

( * ) Notice: Under 35 U.S.C. 154(b), the term of this patent shall be extended for 0 days.

(21) Appl. No.: 09/359,746

(22) Filed: Jul. 23, 1999

Related U.S. Application Data

(60) Provisional application No. 60/093,964, filed on Jul. 24, 1998.

(51) Int. Cl.⁷ ............................................. B01J 19/08
(52) U.S. Cl. ............................... 204/157.3; 422/186
(58) Field of Search ............................ 204/164, 177, 204/157.3; 422/186

(56) References Cited

U.S. PATENT DOCUMENTS 5,782,085 * 7/1998 Steinwandl et al. .............. 204/157.3

* cited by examiner

*Primary Examiner*—Kishor Mayekar
(74) *Attorney, Agent, or Firm*—Emily G. Schneider; William R. Moser; Paul A. Gottlieb

(57) ABSTRACT

A method for non-thermal plasma aftertreatment of exhaust gases the method comprising the steps of providing short risetime (about 40 ps), high frequency (about 5G hz), high power bursts of low-duty factor microwaves sufficient to generate a dielectric barrier discharge and passing a gas to treated through the discharge so as to cause dissociative reduction of the exhaust gases. The invention also includes a reactor for generating the non-thermal plasma.

14 Claims, 3 Drawing Sheets

METHOD FOR GENERATING A HIGHLY REACTIVE PLASMA FOR EXHAUST GAS AFTERTREATMENT AND ENHANCED CATALYST REACTIVITY

CROSS-REFERENCE TO RELATED APPLICATIONS

This application claims the benefit of U.S. Provisional Application No. 60/093,964, filed Jul. 24, 1998 for "METHOD FOR GENERATING A HIGHLY REACTIVE PLASMA FOR EXHAUST AFTERTREATMENT AND ENHANCED CATALYSTS REACTIVITY" which is hereby incorporated by reference herein.

GOVERNMENT RIGHTS

The United States Government has rights in this invention pursuant the terms of Department of Energy contract number DE-AC05-96OR22464.

FIELD OF THE INVENTION

The present invention relates to exhaust gas remediation and in particular, a method and apparatus for enhancing the reactivity of the material catalysts found within catalytic converters of cars, trucks and power stations.

BACKGROUND OF THE INVENTION

Plasma aftertreatment of exhaust gases has previously been identified as a possible remediation technique since non-thermal plasma can induce a host of new chemical reactions due to electron excitation thereby causing the production of an abundant amount of radicals and excited state molecules. Plasma aftertreatments rely upon the generation of high local electric fields which directly produce energetic electrons. These energetic electrons can influence the chemistry, even the collision dominated regime, because they do not lose much energy in elastic collision due to their small mass, but instead bounce around and transfer most of their energy to molecules; either dissociating, ionizing, or otherwise exciting them. This excitation and radical production can cause extensive changes in reaction rates; and in some cases, by as much as a hundred thousand-fold increase.

While the efficiency of non-thermal plasma may be limited by any of several factors; two limitations that especially inhibit efficient utilization of non-thermal plasma discharge in connection with aftertreatment of exhaust gases are low electrical efficiency and an undesirable reaction pathway. See B. M. Penetrante et al., "Comparison of Electrical Discharge Techniques for Nonthermal Plasma Processing of NO in N2," pp. 679–687 in *IEEE Transactions in Plasma Science*, Vol. 23, No. 4, 1995, the relevant portions of which are incorporated herein by reference.

In the excited state chemistry of non-thermal plasma, it is desirable to produce as high an electric field as possible. This would at first seem to simply entail applying high enough voltages to a suitably arranged configuration of electrodes. However, for non-thermal plasma densities, there occurs considerable plasma shielding of the applied fields, even in the collision dominated regime and field limits. See J. H. Whealton and R. L. Graves, "Exhaust Remediation Using Non-Thermal (Plasma) Aftertreatments: A Review," *Proceedings of the* 1995 *Diesel Engine Emissions Reductions Workshop*, Vol. 23, LaJolla, calif., the relevant portions of which are incorporated herein by reference. This space charge shielding is due to the charge imbalances arising within the plasma because of the higher mobility of electrons as compared to positive ions. Accordingly, the electric fields are generally limited by high voltage breakdowns which in turn leads to low impedance discharge. Further, plasma shielding effects take place for fields at frequencies below the electron plasma frequency. As a result of this shielding, the volume of plasma where the more favorable high field enhanced reduction reactions occur is reduced to either within a few Debye lengths or an electron energy relaxation distance of the plasma edge thereby diminishing a high field reaction volume by orders of magnitude.

As noted above, problems also arise with respect to the chemistry path. While both oxidation and reduction reaction pathways are possible avenues for the dissociation of $NO_x$, their respective chemistries differ. The oxidation reaction pathway will result in the production of compounds that include $N_2O$ and nitric acid. Since nitric acid is toxic, it's generation is to be avoided, especially in automobiles, trucks or other mobile applications. On the other hand, the dissociative attachment occurring in the reduction reaction pathway is more favorable since it lead to the formation of benign $N_2$. Unfortunately, the above noted difficulty in reaching high E/N in prior art discharges has prevented development of a plasma aftertreatment device that will achieve a high fraction reduction of $NO_x$ as opposed to the less desirable oxidation.

In view of the above problems and deficiencies of plasma aftertreatments of exhaust gases, the present invention was developed.

OBJECTS AND SUMMARY OF THE INVENTION

Accordingly, it is an object of the present invention to provide a method of non-thermal plasma aftertreatment of exhaust gas whereby the electric fields will no longer be limited by high voltage breakdowns and associated low impedance discharge.

It is another object of the present invention to provide a method of non-thermal plasma aftertreatment of exhaust gas whereby significant increases in the arc transition electric field are achieved by incorporation of high frequency power (5 Ghz) implying a 40 ps risetime.

It is a further object of the present invention to provide a method of non-thermal plasma aftertreatment of exhaust gas whereby any plasma shielding effects taken place for fields at frequencies below the electron plasma frequency are significantly reduced through the use of high frequency power.

It is yet another object of the present invention to provide a method of non-thermal plasma aftertreatment of exhaust gas whereby efficient coupling of high frequency power to produce high electric fields is achieved through application of resonance cavities.

It is an additional object of the invention to provide a method of non-thermal plasma aftertreatment of exhaust gas whereby any surface charging of dielectrics, to the extent it does occur, will enhance the fields in the next (reverse field) half cycle.

It is another object of the present invention to provide a method of non-thermal plasma aftertreatment of exhaust gas whereby the electric fields ramp up so quickly (about 40 ps) that the probability of the discharge initiating near threshold is substantially reduced thereby resulting in a tilt of the reaction pathway toward the more desirable reduction pathway as opposed to the oxidation pathway.

It is further object of the present invention to provide a method and apparatus of non-thermal plasma aftertreatment of exhaust gas for use with existing smart solid catalytic converters to synergistically improve the reactivity and efficiency of the catalyst and the exhaust remediation.

It is yet another object of the present invention to provide a method of non-thermal plasma aftertreatment of exhaust gas that will enable much higher E/N, and a continuous production of atomic Nitrogen by employing bursts of high frequency AC electric field having fast risetimes and many cycles per burst; specifically, high-power microsecond bursts of about 6 Ghz and microwaves having a risetime of about ~40 ps to provide pulse risetimes approximately 100 times shorter than that of the prior art whereby thousands of electric field oscillations per burst of microwave power are achieved.

It is an additional object of the invention to provide a method of non-thermal plasma aftertreatment of exhaust gas whereby the catalyst is heated to increase reactivity only very locally in places where the reactions are taking place for purposes of providing controlled and highly localized enhanced catalyst reactivity.

It is another object of the present invention to provide a new plasma generator for the non-thermal plasma aftertreatment of exhaust gases whereby plasma shielding is reduced and a higher E/N in the bulk of the plasma is achieved, reducing the $N_2$ vibrational excitation risk and permitting high electron temperatures.

It is an additional object of the present invention to provide a method of non-thermal plasma aftertreatment of exhaust gas whereby field reduction caused by plasma shielding is prevented, Atomic nitrogen is produced and made available during substantially the entire treatment process, any surface charging of the dielectrics that may occur will enhance fields in the next half cycle, field limits due to arc breakdowns are significantly increased and higher fields are achieved.

The present invention is further directed to a method of non-thermal plasma aftertreatment of exhaust gases having reduced plasma electric field shielding, increased availability of atomic nitrogen, exploitation of surface charging of dielectrics, avoidance of (low field) threshold initiated discharges, and achievement of a higher high-energy tail on the electron distribution function.

In summary, the present invention provides a method for non-thermal plasma aftertreatment of exhaust gases the method comprising the steps of providing short risetime (about 40 ps), high frequency (about 5 Ghz), high power bursts of low-duty factor microwaves sufficient to generate a dielectric barrier discharge and passing a gas to treated through the discharge so as to cause dissociative reduction of the exhaust gases.

The present invention is also directed to a waveguide reactor for generating non-thermal plasma for aftertreatment of exhaust gases, the reactor comprising a pulsed microwave source for generating a DBD having electric field rise times of less than about 50 ps and a frequency of about 5 Ghz, a waveguide including resonance cavity, the waveguide for receiving pulsed microwaves from the microwave source and generating a dielectric barrier discharge therein whereby exhaust gases subjected to the generated dielectric barrier discharge are caused to be dissociated by a high fraction reduction reaction.

The present invention is further directed to a waveguide reactor as set forth above and operatively associated with a material catalyst whereby the short burst, high-power microwave fields generated by the reactor are caused to increase the reactivity of the catalyst surface for purposes of exhaust gas remediation.

These and other objects of the present invention will become apparent from the following detailed description.

BRIEF DESCRIPTIONS OF THE DRAWINGS

DETAILED DESCRIPTION OF THE INVENTION

Figure 1:
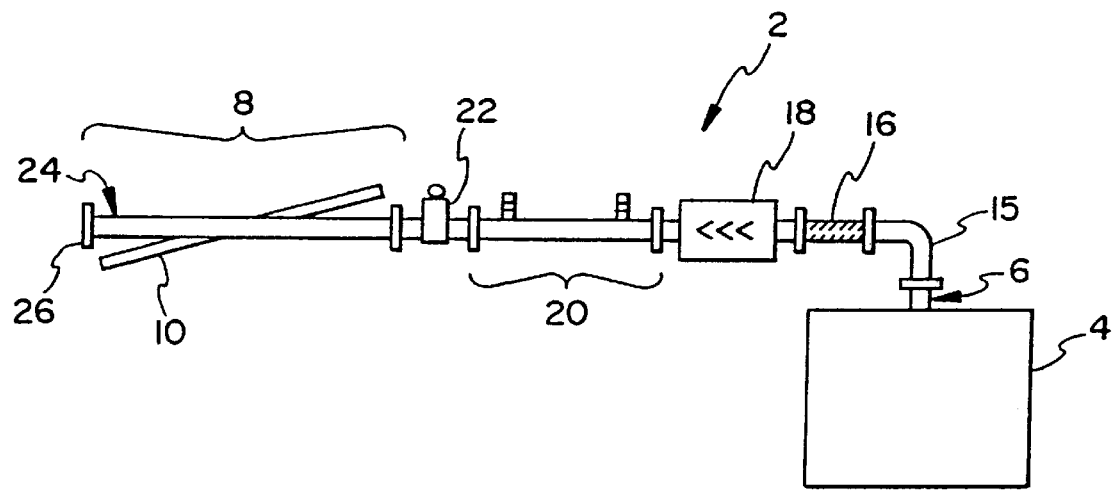
FIG. 1 is a schematic diagram of a waveguide reactor according to the present invention for generating non-thermal plasma.

Turning to FIG. 1, a waveguide reactor 2 for microwave generated non-thermal plasma according to the present invention is illustrated. The reactor 2 is shown to include a microwave source; namely, a pulsed magnetron tube 4 capable of generating a DBD having electric field rise times of less than about 50 ps. In the preferred embodiment, the pulsed magnetron tube 4 and power supply has a frequency output tunable from about 5.3 GHz to about 5.8 GHz, a peak output power of about 250kW and an average power. Output of about 250 W with a duty factor of 0.001. The output pulse widths can be 0.5, 1.5 and 2.25 μs with a duty factor of 0.001.

Figure 2:
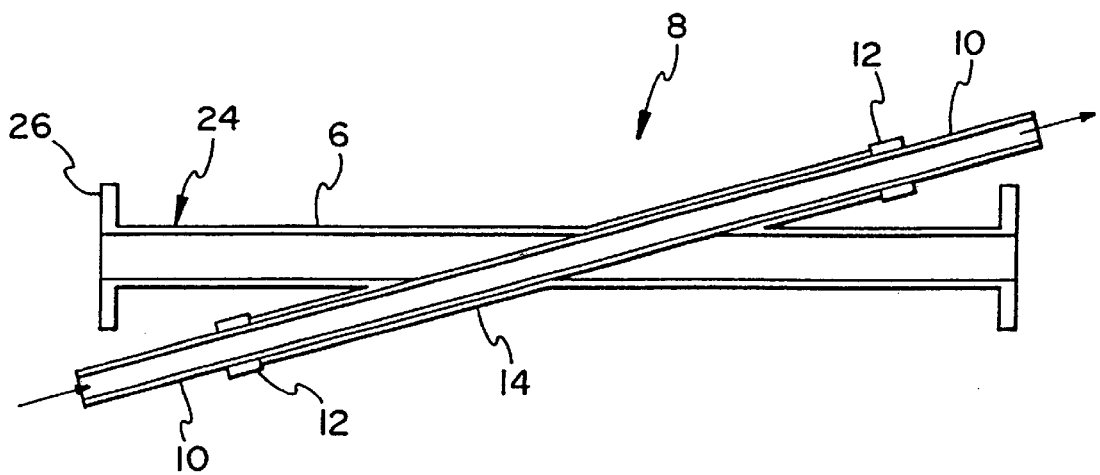
FIG. 2 is an enlarged view of the flow reactor shown in FIG. 1.

The microwave energy generated by the pulsed magnetron tube 4 is conveyed to the waveguide reactor 2 by a WR-187 waveguide 6, the waveguide 6 including a flow reactor 8. The flow reactor 8 is best shown in FIG. 2 and comprises a 43 cm length of the waveguide 6 provided with a 16 mm outer diameter and 14 mm inner diameter quartz tube 10 penetrating through the waveguide 6 at a 15 degree angle. The microwave electric field is generated between the top and bottom walls of the waveguide portion of flow reactor 8 and thus passes through the quartz tube 10 in the region where the quartz tube 10 is in the waveguide 6. The quartz tube 10 is angled to provide a slow change in the dielectric constant in the waveguide 6. Tube couplings 12 are provided to secure the quartz tube 10 to a copper sheath tube 14 secured to the outer diameter of the quartz tube 10 and extending exterior of the waveguide 6. The copper sheath tube 14 is shown to comprise a 15 cm length having a 16.25 mm inner diameter.

In the alternative, the flow reactor may comprise a 2.5 cm outer diameter quartz tube having a 0.62 cm diameter copper rod down the center and including a perforated brass screen around the outside. This embodiment will create a coaxial line in which the microwaves can propagate with a radial electric field through which the gases to be treated will flow. The microwave energy is coupled into the coaxial line of the flow reactor by provision of a waveguide-to-coaxial adapter (not shown). Tuning elements (not shown) at the inlet and outlet of this coaxial line permit matching of the waveguide to the coaxial line. The characteristic impedance of this coaxial line is approximately 80 ohms.

Returning to FIG. 1, the waveguide reactor 2 is shown to further include an E-plane bend 15 provided in the waveguide 6 at the outlet of the magnetron 4. A flexible waveguide 16 is also provided together with an isolator 18 and a signal sampling coupler 20 operably associated with coaxial detectors for measuring the applied and reflected power levels at the reactor 2. A shorting switch 22 is included at one end of the flow reactor 8 and the outlet end 24 of the waveguide 6 is shorted with a plate 26 to reflect any power not absorbed in the first pass back into the reaction volume of the flow reactor 8.

The waveguide reactor 2 is pressurized with sulfurhexaflouride to prevent breakdown around the outside of the quartz tube 10, rather than the inside of the tube. The quartz tube 10 is filled with 4 mm dielectric beads to provide electric field enhancement and electrical breakdown and is further adapted to receive the gas to be treated. A DBD is generated when an arc is initiated between the dielectric surfaces (the inner and outer conductors) hits the quartz tube 10. The electrons at the leading edge of the arc are trapped on the surface of the dielectric, locally canceling out the electric field and extinguishing the arc. A new arc is then immediately formed, but intersecting the dielectric surface at a different location.

The method and apparatus according to the invention employs bursts of high-frequency AC electric fields with fast risetimes and many cycles per burst. Specifically, high-power microsecond bursts of about 5 Ghz microwaves are used that have a risetime of around 40 ps to provide thousands of electric field oscillations per burst of microwave power.

The above method and apparatus provides several advantages. For 40 ps risetime, the fields turn on with a time scale short compared with the time an electron drifts toward the edge of the plasma; strict space charge neutrality is thereby achieved in the plasma preventing field reduction due to plasma shielding. Atomic nitrogen is produced and available during the entire treatment since the time between microwave bursts is small compared to the recombination time thereby achieving a higher fraction of reduction of NOx as opposed to less desirable oxidation. Surface charging of dielectrics, to the extent it occurs at all, will enhance the fields in the next (reverse field) half cycle. Field limits due to arc breakdowns (e.g. Paschen limit) are significantly increased due to the high frequency. Higher fields caused by having the electric fields ramp up so fast substantially reduces the probability of the discharge initiating near threshold.

In a preferred embodiment of the present invention, the waveguide reactor is used in conjunction with a solid catalyst surfaces (not shown) in proximity to the plasma generated. When applied in conjunction with so-called "smart" catalysts, a significant increase in reactivity on the catalyst surface results. The short burst, high power microwave fields cause enhanced surface effect on the catalyst due to the polarization catastrophe created. Polarizability catastrophe will occur in the transition between vibrational excitation (small displacement and, therefore, small field absorption) and rotational excitation (large displacement, and therefore, large field absorption). When the surface of the material gets hot enough, lattice excursions become sufficiently frequent so that there is occasionally room for a rotational excitation. When this happens, the heating rate increases a hundred fold and produces more excursions producing yet more rotational excitation and so on resulting in a nonlinear polarization catastrophe. On the edge of the dielectric, rotational excitation will occur, even at low temperatures since there is no lattice to get in the way. With the present invention, this heating becomes even more preferential since this is exactly the place where the electric field is strongest. Accordingly, the waveguide reactor of the present invention will allow controlled and highly localized heating of the catalyst material and therefore enhanced reactivity.

The method of the present invention will be illustrated from the following representative example which incorporates herein by reference relevant portions of applicant's publication entitled "Non-Thermal Plasma Exhaust Aftertreatment: Are All Plasmas the Same?" Jul. 28–31, 1997, Diesel Engine Emission Reduction Workshop, UCSD, J. H. Whealton et al.

EXAMPLE

The plasma generator of the present invention was applied for conversion of $NO_x$ in $N_2$. The gas concentrations of $NO_x$ were determined by chemiluminesnce (Rosemount model 951) operated in both NO and $NO_x$ mode. $NO_2$ was calculated from the difference between the two numbers. $O_2$ was measured with a fuel cell type analyzer (Illinois Instruments Model 2560).

The example was conducted with the above-described waveguide reactor for treatment of a mixture of NO in $N_2$. Initial gas concentration into the reactor was set to 612 ppm with a flow rate of 3.4 lpm. This resulted in a residence time of 3 s in the entire tube, or a space velocity of 1200 h-1 and represented a lower limit of space velocity. In most cases, the discharge is active over a small portion of the tube. Because no $H_2O$ was present in the gas mixture, the outlet of the reactor was fed directly into the analyzers.

The microwave energy was coupled into the coaxial line of the flow reactor by means of the earlier noted waveguide-to-coaxial adapters. Tuning elements at the inlet and outlet of this coaxial line permit matching of the waveguide to the coaxial line. The characteristic impedance of the coaxial line is approximately 80 ohms. For each experimental run, the system was tuned to maximize the volume containing electrical discharge and the $NO_x$ conversion. The total active volume was typically 60 $cm^{+3}$. The tuning maximized the amplitude of the standing waves in the waveguide reactor by maximizing the power coupled into the coaxial line and minimizing the power leaving the line through either the inlet or outlet waveguide-to-coaxial adapters.

Several different peak RF power levels and duty factors were applied. The waveguide reactor was capable of providing 0.5, 1.5, and 2.25 $\mu s$ pulse widths at repetition rates ranging from <200 Hz to 2 kHz. The peak transmitted powers ranged from 100–250 kW with average (duty-factor corrected) transmitted powers of 50–315 W. Transmitted and reflected powers were monitored using a calibrated waveguide signal sampler having coaxial detectors. The absorbed power was taken as the difference of the transmitted and reflected powers. This is an upper bound for absorbed power because other losses are neglected.

Figure 3:
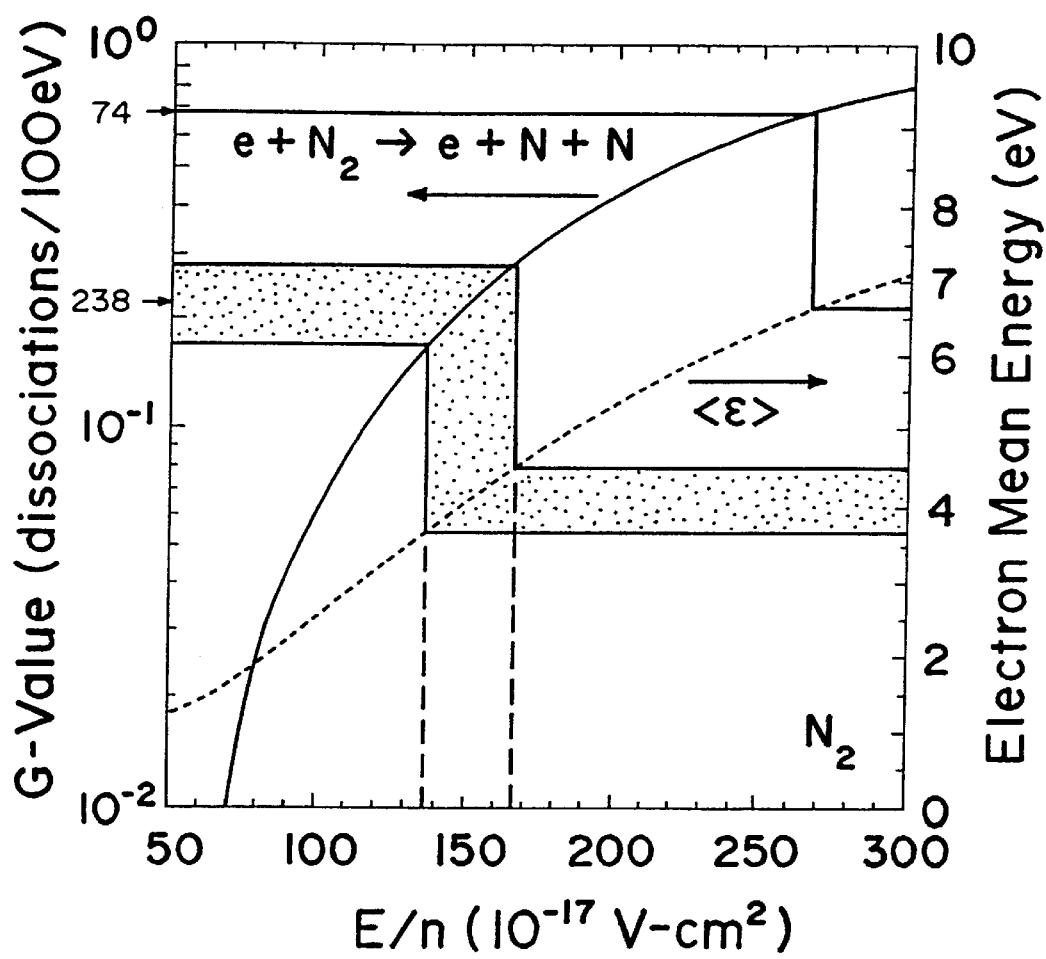
FIG. 3 is a graph illustrating a plot of calculated G-value for electron-impact dissociation of $N_2$ according to an example of the present invention and electron mean energy (eV) as a function of the reduced electric field E/n.

FIG. 3 illustrates a plot of NO conversion versus the absorber power for three different pulse widths at maximum peak powers, but with varying pulse repetition rates. The 1.5 $\mu s$ pulse width provided the best performance. This appears to be due to maximization of electron generation and heating before plasma shielding of the electric fields occurs.

Figure 4:
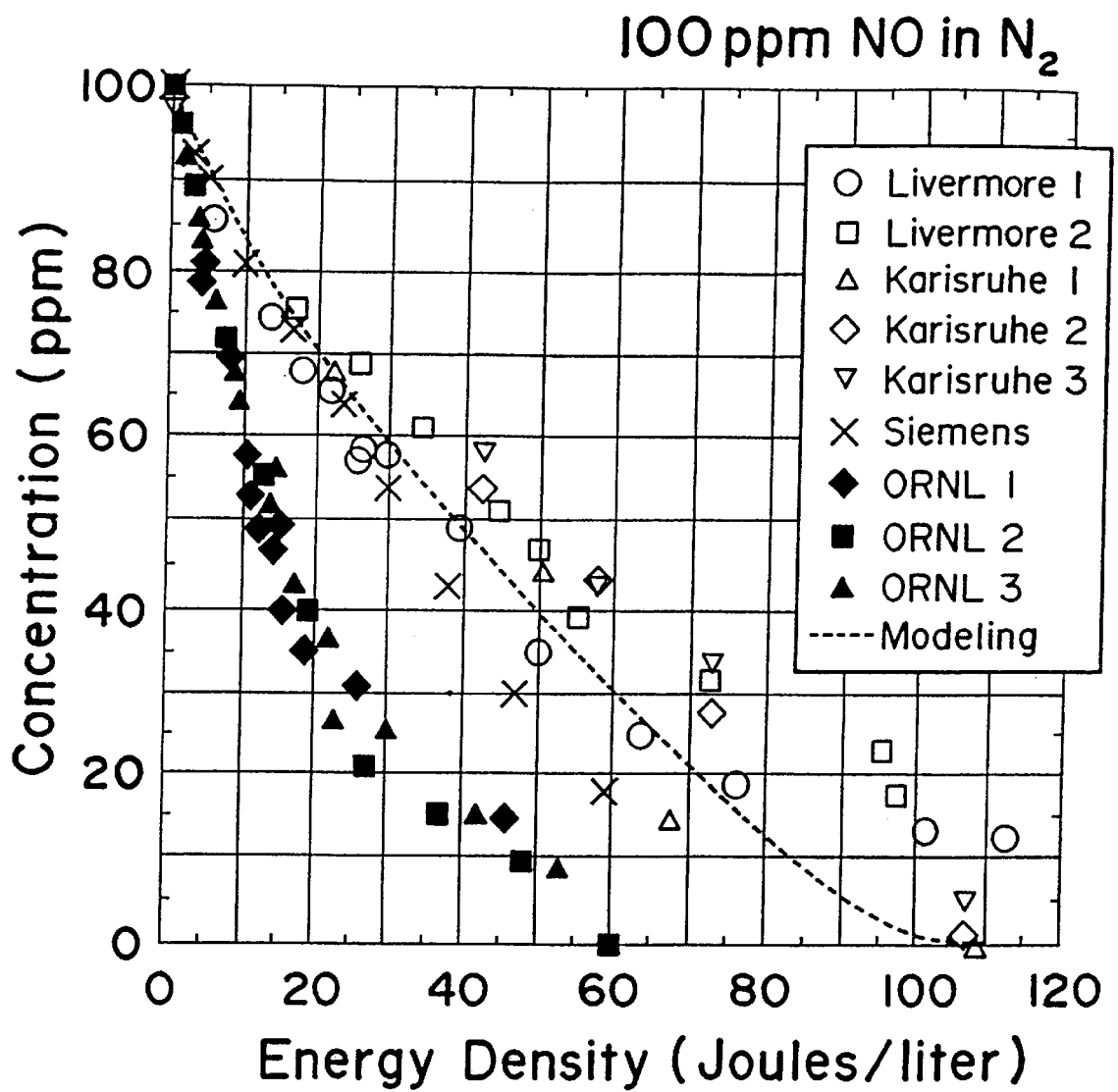
FIG. 4 is a graph illustrating a plot of NO conversions versus the absorbed power according to an example of the present invention.

Because of the favorable results of the 1.5$\mu s$ pulses, a series of powers and frequencies were investigated. The best results were obtained with high power at repetition rates of 200–500 Hz. For comparative purposes, the input energy densities disclosed in the prior art of the Penetrante et al. publication, the relevant portions of which have been incorporated herein by reference, are shown in FIG. 4 for destruction of a 100 ppm NO stream. The prior art pulsed corona and dielectric barrier discharge are identified as Livermore 1 and 2, Karlsruhe 1, 2 and 3 and Siemens. The present invention is identified as ORNL 1, 2 and 3. The prior art data is also incorporated into FIG. 3. The resulting energy per molecule NO converted in the prior art is 238 eV/molecule and a line corresponding to that energy has been added to FIG. 3 for purposes of comparison. As can be seen, the microwave-generated plasma according to the present invention is converting at a significantly lower energy per molecule (74 eV/molecule). The electron mean energy, as a function of the reduced electric field, can also be seen. The prior art Livermore, Karlsruhe and Siemens data having an electron mean energy of about 4.2 eV whereas the present invention providing an electron mean energy of 6.6 eV.

The high-peak power, low-repetition rate data indicates high efficiency of conversion with low-energy densities for the present invention. This appears to result from the efficiency at which microwave energy can penetrate a plasma and heat the electrons, provided the microwave frequency remains higher than the characteristic electron plasma frequency. In other words, cutoff is avoided. For the 5.5 Ghz typically used in the present example, the corresponding electron cutoff density is approximately $3.5 \times 10-11$ cm–3.

The above demonstrates improvement of the present invention for removal of NO) in $N_2$ over that provided in the prior art. As best shown in FIG. 3, instead of the 238 eV per removed NO obtained with the slower rise time plasmas of the prior art, a 70 percent reduction (75 eV per removed NO) was obtained by the present invention. Further, the 6.5 eV electron temperature of the present invention is substantially greater than the 4 eV provided by the prior art. The fast risetime (40 ps) discharge is comparable to electron transport times in the plasma. This is obtained from a 5.5 GHz microwave generator coupled to a suitable resonance cavity. Plasma shielding is thereby reduced and higher E/N in the bulk of the plasma achieved This appears to reduce the $N_2$ vibrational excitation risk and provides for high electron temperatures as compared to that provided in the prior art. Instead of the 238 eV per removed NO obtained with the slower rise time prior art plasmas, a 25 percent reduction (167 eV per removed NO) was obtained by the present invention. When the present invention is combined with smart catalytic converters, the higher electron temperature and concomitant different reaction kinetics i.e. enhanced excited state molecular production, of the present invention provides a synergistic and enhanced improvement of exhaust remediation. This is in addition to the. enhanced reactivity of the catalyst material itself due to the microwave induced rotational excitation at the catalyst surface edges.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A method for non-thermal plasma aftertreatment of $NO_x$-containing exhaust gases, the method comprising the steps of:
   a) providing pulsed microwaves for generating a dielectric barrier discharge, the microwaves having a risetime sufficiently short and power frequency sufficiently high so that a plasma having substantial charge neutrality is produced; and
   b) passing a gas to be treated through the generated barrier discharge having a substantial charge neutrality such that reductive dissociation of the gas is caused to occur, the fraction of the reaction pathway for reductive dissociation is at least greater than that of oxidative dissociation.

2. The method of claim 1 and wherein:
   a) the microwave has a risetime between about 40 ps to about 50 ps.

3. The method of claim 1 and wherein:
   a) the microwave has a frequency of between about 5 Ghz to about 6 Ghz.

4. The method of claim 1 and wherein:
   a) the pulsed microwaves are generated by a magnetron tube and power supply having a peak power output of about 250 kW and a duty factor of about 0.0001.

5. The method of claim 1 and wherein:
   a) the output pulse width of the pulsed microwaves have a distance selected from the group consisting of 0.5, 1.5 and 2.25 $\mu$s.

6. The method of claim 1 and further including the steps of:
   a) providing a solid material catalyst in the path of the gas to be treated; and,
   b) selectively applying the pulsed microwaves to a localized region of the solid material catalyst sufficient to cause a polarizability catastrophe to a localized region of the catalyst surface such that reactivity of the catalyst with the gas is enhanced.

7. A reactor for generating a non-thermal plasma to treat $NO_x$-containing exhaust gases, the reactor comprising:
   a) a pulsed microwave source, the pulsed microwave source configured to provide pulsed microwaves having a risetime sufficiently short and power frequency sufficiently high so that a plasma having substantial charge neutrality will be produced;
   b) a waveguide operatively associated with said microwave source for receiving pulsed microwaves from said microwave source; and
   c) a flow reactor operatively associated with said waveguide, said flow reactor adapted to generate a dielectric barrier discharge from the pulsed microwaves conveyed through said waveguide, said flow reactor comprising a quartz tube is adapted to receive an exhaust gas to be treated and is filled with dielectic beads.

8. The reactor of claim 7 and wherein:
   a) said quartz tube having a copper rod disposed centrally therein and a brass screen surrounding the exterior thereof.

9. The reactor of claim 7 and wherein
   b) said quartz tube penetrates through said waveguide at an angle sufficient to provide a change in the dielectric constant of said waveguide.

10. The reactor of claim 7 and wherein:
    a) said waveguide is pressurized with sulphur-hexaflouride.

11. The reactor of claim 7 and wherein:
    a) said microwave source is a magnetron tube and power supply having a frequency output tunable from about 5 Ghz to about 6 Ghz and adapted to generate microwaves having risetimes between about 40 ps to about 50 ps for producing a dielectric barrier discharge.

12. The reactor of claim 7 and wherein:
    a) said microwave source has a peak power output of about 250 kW and a duty factor of about 0.0001.

13. The reactor of claim 7 and wherein:
a) said microwave source adapted to produce pulsed microwaves having an output pulse width selected from the group consisting of 0.5, 1.5 and 2.25 µs.

14. The reactor of claim 7 and further including:
a) a solid material catalyst disposed in the path of the gas to be treated; and,
b) means for selectively applying the pulsed microwaves to a localized region of the solid material catalyst sufficient to cause a polarizability catastrophe to a localized region of the catalyst surface such that reactivity of the catalyst with the gas is caused to be enhanced.

* * * * *